United States Patent
Watanabe et al.

(10) Patent No.: US 7,701,669 B2
(45) Date of Patent: Apr. 20, 2010

(54) MAGNETIC HEAD SLIDER HAVING APERTURE TO PREVENT FALL FORWARD AND MAGNETIC DISK DRIVE FOR USING SAID SLIDER

(75) Inventors: Kouichi Watanabe, Kanagawa (JP); Sunao Yonekawa, Kanagawa (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 822 days.

(21) Appl. No.: 11/501,583

(22) Filed: Aug. 8, 2006

(65) Prior Publication Data
US 2007/0030597 A1 Feb. 8, 2007

(30) Foreign Application Priority Data
Aug. 8, 2005 (JP) ............................. 2005-229061

(51) Int. Cl.
*G11B 5/60* (2006.01)
(52) U.S. Cl. ................................. 360/235.6; 360/236.4
(58) Field of Classification Search .... 360/235.4–237.1
See application file for complete search history.

(56) References Cited

U.S. PATENT DOCUMENTS

| | | | |
|---|---|---|---|
| 5,940,249 A * | 8/1999 | Hendriks | 360/235.6 |
| 6,373,661 B1 | 4/2002 | Tokuyama et al. | |
| 6,452,751 B1 | 9/2002 | Tokuyama et al. | |
| 6,483,667 B1 * | 11/2002 | Berg et al. | 360/235.6 |
| 6,597,537 B2 | 7/2003 | Tokuyama et al. | |
| 2004/0090709 A1 * | 5/2004 | Mundt et al. | 360/236.3 |
| 2007/0019329 A1 * | 1/2007 | Yao et al. | 360/236.3 |
| 2007/0025022 A1 * | 2/2007 | Agari et al. | 360/235.8 |

FOREIGN PATENT DOCUMENTS

| | | |
|---|---|---|
| JP | 06-325530 | 11/1994 |
| JP | 2004-022115 | 1/2004 |

* cited by examiner

*Primary Examiner*—A. J. Heinz
(74) *Attorney, Agent, or Firm*—Townsend and Townsend and Crew LLP; Rambod Nader

(57) ABSTRACT

When the flying height of a magnetic head slider lowers, there arises the problem that the magnetic head slider assumes a forwardly falling attitude and a front edge portion of a leading end of the magnetic head slider comes into contact with a magnetic disk surface, causing damage to the disk surface. To address the problem, one aspect of the invention is directed to a magnetic head slider which includes an air bearing surface, a leading end and a trailing end. Three flying pads are formed on the air bearing surface and a step bearing surface is formed around the first and second flying pads near the leading end and a negative pressure groove for producing a negative pressure is formed in such a manner that the leading side is surrounded by the step bearing surface. The third flying pad is formed near the trailing end and is provided with a magnetic head. A step bearing is formed on the leading side of the third flying pad. Further, the magnetic head slider is formed with an aperture in a front edge portion of the leading end.

8 Claims, 3 Drawing Sheets

MAGNETIC HEAD SLIDER HAVING APERTURE TO PREVENT FALL FORWARD AND MAGNETIC DISK DRIVE FOR USING SAID SLIDER

CROSS-REFERENCES TO RELATED APPLICATIONS

This application claims priority from Japanese Patent Application No. JP2005-229061, filed Aug. 8, 2005, the entire disclosure of which is incorporated herein by reference.

BACKGROUND OF THE INVENTION

The present invention relates to a magnetic head slider and a magnetic disk drive. In particular, the present invention is concerned with a magnetic head slider of a low flying type for attaining high reliability and high density recording, as well as a magnetic disk drive with the magnetic head slider mounted thereon.

The magnetic disk drive has recently been becoming increasingly smaller in size and larger in capacity and data recorded on a recording medium (a magnetic disk) have been becoming increasingly higher in recording density. With this trend, it is necessary to diminish the space between a magnetic head slider and a magnetic disk, i.e., the flying height of the magnetic head slider. A magnetic head slider able to fly stably at a low flying height has been proposed. For example, Patent Literature 1 (Japanese Patent Laid-Open No. 6-325530) discloses such a magnetic head slider that a surface (stepped surface) depressed from a plane portion of a flying rail (an air bearing rail) of a slider is formed on a leading side of the flying rail and the depth (height of the stepped portion) of the stepped surface is set at an extremely small value (700 nm or less) to attain a constant flying height that does not depend on the peripheral velocity of the magnetic disk. The slider having a stepped portion of such an extremely small depth is designated a microstep slider.

Patent Literature 2 (Japanese Patent Laid-Open No. 2000-21109) discloses another magnetic head slider of a low flying type. In this slider, a very small lug having a height equal to or larger than a step depth (height) is formed on a stepped surface provided on a leading side of a flying rail of a slider, whereby the slider is difficult to rotate while falling forward and a front edge of the stepped surface is prevented from contacting the disk surface.

If the flying height of a magnetic head slider varies and the magnetic head slider comes into contact with the surface of a magnetic disk while flying over the magnetic disk, an air bearing surface (the surface opposed to the disk) of the magnetic head slider is pulled with a frictional force and the magnetic head slider rotates about a pivot (a load acting point) of a suspension and assumes a forwardly falling attitude. As a result, a front edge portion on a leading end side of the magnetic head slider comes into contact with the disk surface, whereupon an air inlet port is blocked and there no longer is an air flow on the air bearing surface side of the magnetic head slider. Consequently, a flying force is not created in the magnetic head slider and the magnetic head slider is put in continuous contact with the magnetic disk surface while retaining its forwardly falling attitude, thus giving rise to the problem that the magnetic disk is damaged.

In a magnetic disk drive using a smooth magnetic disk for attaining a low flying height of a magnetic head slider, a large frictional force poses a serious problem. With a large frictional force, the magnetic head slider assumes a forwardly falling attitude and, therefore, preventing contact of the front edge portion on the leading end side of the magnetic head slider with the magnetic disk surface is an important subject for preventing damage to the recording medium and for ensuring reliability. To solve this problem, a method involving chamfering (curving) the front edge portion on the leading end side to increase the area of contact and thereby decrease a contact stress (surface pressure) has been proposed. However, since chamfering is usually performed by machining of large variations, it greatly contributes to the generation of a change in flying height. Such a change in flying height causes malfunctions in data read and write. Thus, this method is not an effective approach for preventing damage of the magnetic disk caused by contact therewith of the front end portion on the leading end side.

As described in Patent Literature 2, if a very small lug is formed on the stepped surface provided on the leading side of the flying rail of the magnetic head slider so as to prevent contact of the front edge portion on the leading end side of the magnetic head slider with the disk surface, a certain height of the lug restricts reduction in flying height and as the case may be it is impossible to attain a low flying height.

Decreased atmospheric pressure causes excessive reduction in flying height of the magnetic head slider. More particularly, in case of using the magnetic disk drive at a high elevation, the flying height lowers due to reduction of the atmospheric pressure. When the flying height lowers excessively, the magnetic head slider assumes a forwardly falling attitude, thus giving rise to the problem that the front edge portion on the leading end side of the magnetic head slider comes into contact with the magnetic disk surface and the recording medium is damaged.

BRIEF SUMMARY OF THE INVENTION

It is a feature of the present invention to provide a magnetic head slider which can be prevented from assuming a forwardly falling attitude and can revert to its original state promptly even in the event it should assume a forwardly falling attitude.

It is another feature of the present invention to provide a magnetic disk drive of high reliability able to prevent damage of a recording medium caused by continuous contact of a front edge portion of a magnetic head slider with the surface of a magnetic disk and thereby able to read and write information with respect to the magnetic disk.

In accordance with an aspect of the present invention, a magnetic head slider comprises a leading end, an air bearing surface and a trailing end. The air bearing surface includes flying pads formed on the leading end side and the trailing end side; a step bearing surface formed between the leading end and the flying pads and around the flying pads; a negative pressure groove formed in a depressed state with respect to the step bearing surface; a magnetic head provided in the flying pad formed on the trailing end side; and an air intake portion for conducting air to the flying pad formed on the leading end side upon contact of the leading end with a magnetic disk.

According to the present invention it is possible to provide a magnetic head slider which can be prevented from assuming a forwardly falling attitude and can revert to its original state promptly even in the event it should assume a forwardly falling attitude.

According to the present invention it is also possible to provide a magnetic disk of high reliability able to prevent damage of a recording medium caused by continuous contact of a front edge portion of a magnetic head slider with the surface of a magnetic disk and thereby able to read and write information with respect to the magnetic disk.

DETAILED DESCRIPTION OF THE INVENTION

Figure 1:
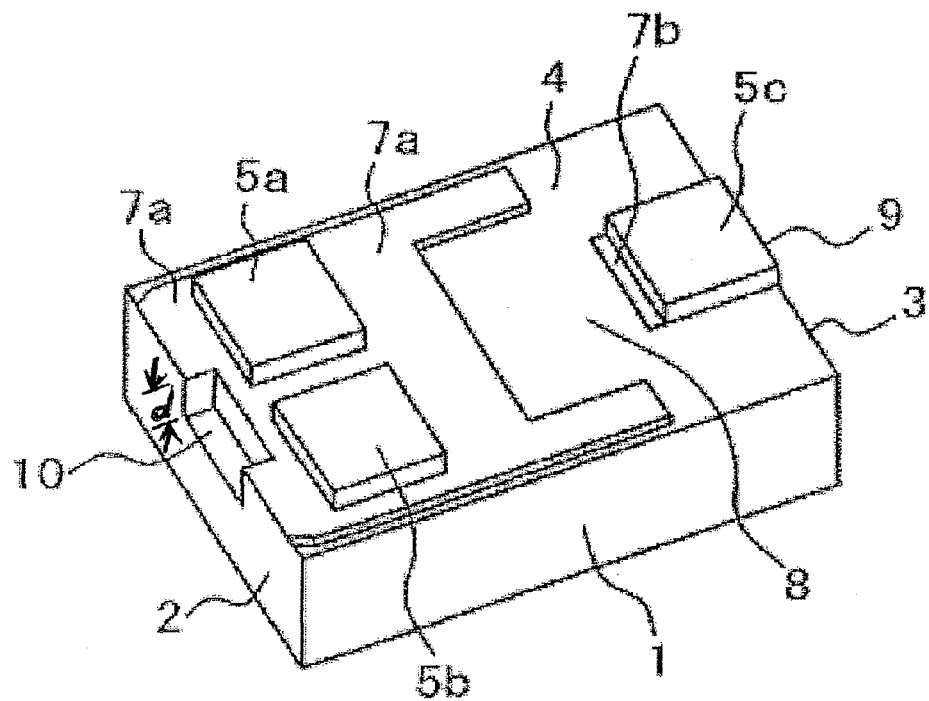
FIG. 1 is a perspective view of a magnetic head slider according to a first embodiment of the present invention as seen in the direction of an air bearing surface thereof.

A first embodiment of the present invention will now be described with reference to FIG. 1. FIG. 1 is a perspective view of a magnetic head slider as seen from an air bearing surface side. The magnetic head slider, indicated at 1, is adapted to fly over the surface of a magnetic disk as a recording medium. The magnetic head slider 1 includes an opposed-to-disk surface 4 serving as an air bearing surface, a leading end 2 located on a side to which air is admitted with rotation of the magnetic disk, and a trailing end 3 located leeward of the leading end and from which air flows out. Three flying pads 5 for generating a flying force are formed on the opposed-to-disk surface (air bearing surface) 4. Two of the flying pads 5a, 5b are disposed at both ends on the leading side of the magnetic head slider 1 and the remaining one 5c is formed centrally on the trailing side. A step bearing surface 7a for adjusting the amount of a positive pressure generated by flying pads 5a and 5b located on the leading side is formed around the flying pads 5a and 5b. Further, a negative pressure groove 8 for producing a negative pressure is formed in such a manner that the leading side is surrounded by the step bearing surface 7a.

A flying pad 5c is formed near the trailing end 3. The flying pad 5c is provided with a magnetic head 9 for write of information to the magnetic disk or read of information recorded on the magnetic disk. A step bearing surface 7b for adjusting a positive pressure produced by the flying pad 5c is formed on the leading side of the flying pad 5c. The step bearing surface 7b is to be formed at least on the leading side of the trailing-side flying pad 5c insofar as the step bearing surface 7b operates so that a positive pressure is produced in the flying pad 5c.

The magnetic head slider 1 shown in FIG. 1 has a length of 1.25 mm, a width of 1.0 mm and a thickness of 0.3 mm, which size corresponds to the size called picoslider. The flying pads 5a and 5b located on the leading side and the flying pad 5c located on the trailing side are approximately flush with each other. The step bearing surfaces 7a and 7b are also approximately flush with each other. The depth from the flying pads 5a, 5b and 5c to the step bearing surfaces 7a and 7b is 150 to 240 nm and the depth from the flying pads 5a, 5b and 5c to the negative pressure groove 8 is 1 to 2 μm. The step bearing surfaces 7a, 7b, 7c and the negative pressure groove 8 are formed by a processing method such as ion milling or reactive ion etching (RIE).

The slider 1 is formed with an aperture 10 as an air intake portion on the leading end side of the two leading end-side flying pads 5a and 5b. The aperture 10 is located in a front edge portion of the leading end 2 and has a width of 0.3 to 0.5 mm (one third to one half of the slider width) and a depth (d) of 0.5 to 2 μm with respect to the flying pads 5a and 5b. In terms of process efficiency it is preferable to form the aperture 10 simultaneously with formation of the negative pressure groove 8. A processing method such as ion milling or reactive ion etching (RIE) may be used.

Figure 2:
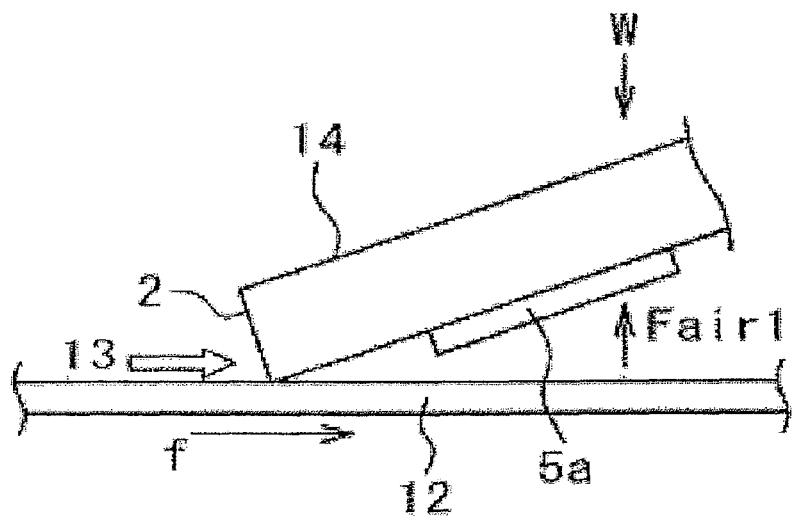
FIG. 2 is a diagram explaining the function of a conventional magnetic head slider.
Figure 3:
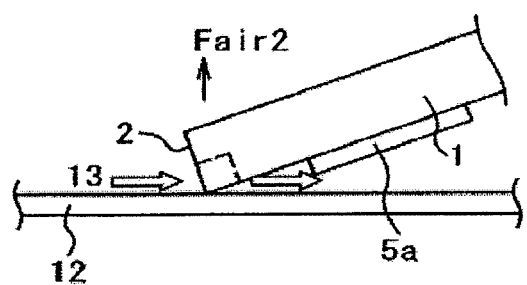
FIG. 3 is a diagram explaining the function of a magnetic head slider according to the first embodiment of the present invention.

Effects of the above first embodiment will now be described with reference to FIGS. 2 and 3. FIG. 2 shows a state of contact between a magnetic disk 12 and a magnetic head slider 14 in the prior art. In the event of contact for some reason between the magnetic head slider 14 and the magnetic disk 12 which is rotating, such a force as shown in FIG. 2 acts on a contact point between the two. Though not shown, a pushing load W acting toward the magnetic disk is exerted on the magnetic head slider 14 from a pivot provided in a suspension which supports the magnetic head slider 14. The reference mark f denotes a frictional force developed between the magnetic head slider 14 and the magnetic disk 12. When a moment Mf induced by the frictional force f between the magnetic head slider 14 and the magnetic disk 12 becomes larger than an angular moment Mw induced by the slider pushing load W of the suspension, the magnetic slider 14 rotates about the pivot in a forwardly falling state and the front edge portion of the leading end 2 comes into contact with the magnetic disk 12. A condition for the forward falling of the magnetic head slider 14 is Mw+Fair1<Mf.

Fair1 in the above expression stands for a slider flying force. For the conventional magnetic head slider 14 free of any aperture, as shown in FIG. 2, the air inlet port is blocked upon contact of the front edge portion of the leading end 2 with the magnetic disk 12 and therefore an air flow 13 cannot reach the flying pad 5a (5b) located on the leading side. Consequently, once the magnetic head slider assumes a forwardly tilted attitude, the flying pads on the air inlet side cannot generate a flying force. As a result, the conventional magnetic head slider 14, upon contact thereof with the magnetic disk 12, continues to slide in contact with the magnetic disk 12 while retaining its forwardly tilted attitude. In the worst case, data may be damaged.

On the other hand, in this embodiment, the aperture 10 is provided. Therefore, when the magnetic head slider 1 assumes a forwardly tilted attitude, an air inlet path to the flying pad 5a (5b) located on the leading side of the magnetic head slider 1 is ensured, as shown in FIG. 3, so that a flying force (restoring force Fair2) is obtained to restore the magnetic head slider 1 to its normal flying attitude. As shown in FIG. 3, moreover, even when the magnetic head slider 1 comes into contact with the magnetic disk 12, since the air inlet path is ensured, the magnetic head slider 1 soon reverts to its normal flying attitude under the restoring force Fair2 and a required flying height thereof is attained, thus making it possible to ensure the reliability of the device. More particularly, in this embodiment, even when the magnetic head slider 1 assumes a forwardly tilted state and the front edge portion of the leading end 2 comes into contact with the magnetic disk 12, the air inlet path is ensured by the aperture 10. Therefore, the restoring force Fair2 based on the flying force acts on the flying pad 5a (5b) located on the leading side and the magnetic head slider 1 reverts to its normal flying attitude, with no chance of damage to the information stored on the magnetic disk 12. Further, in the magnetic head slider 1 of the above embodiment, since the aperture 10 permits the leading-side flying pads 5a and 5b to produce a flying force constantly, the effect obtained is that it is difficult for the magnetic head slider 1 to fall forward.

Figure 4:
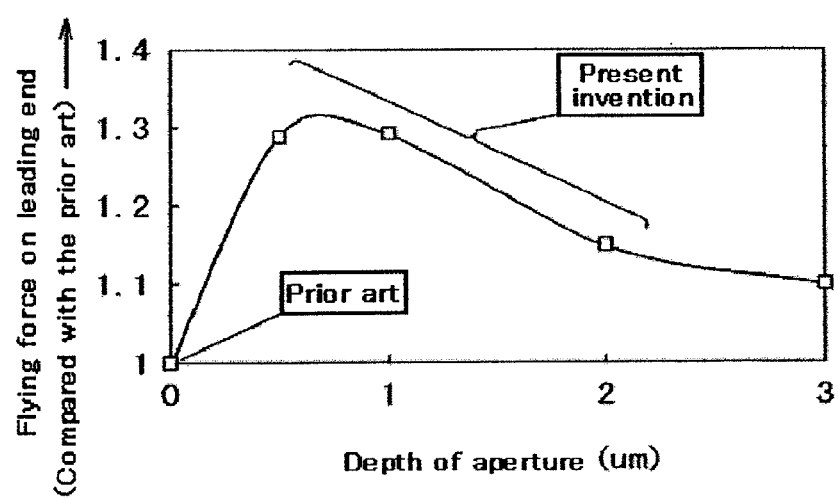
FIG. 4 is a graph showing a relation between the depth of an aperture and a flying force on a leading end-side in the magnetic head slider of the first embodiment.

FIG. 4 shows a relation between the depth of the aperture 10 and the flying force on the leading end side. The relation is represented in terms of comparative values assuming that the flying force of the conventional magnetic head slider 14 not having any aperture is 1. Reference to FIG. 4 shows that the largest flying force is obtained at a depth of the aperture 10 in the range of 0.5 to 1 μm. The flying force decreases markedly at a larger aperture depth than 2 μm. Thus, the depth of the aperture 10 is to be in the range of about 0.5 to 2 μm, preferably about 0.5 to 1 μm. Further, since ion milling takes time, it is preferable from the standpoint of processing that an upper limit of the depth of the aperture 10 to be formed should be equal to the depth of the negative pressure groove 8.

Although in the above first embodiment the application to the picoslider has been described, no limitation is made thereto. The same effects as above can be obtained also in the case of a so-called femtoslider having a length of 0.85 mm, a width of 0.7 mm and a thickness of 0.23 mm. Likewise, the present invention is further applicable to a slider smaller in size than the femtoslider or a slider larger in size than the picoslider.

Figure 5:
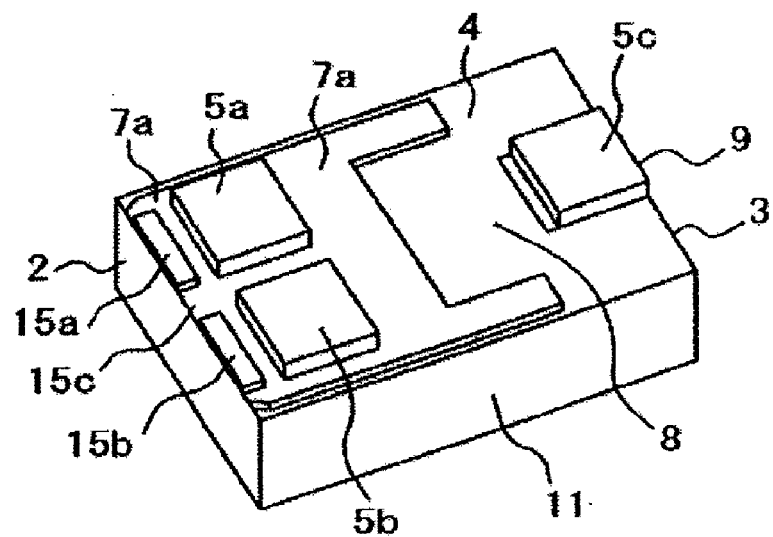
FIG. 5 is a perspective view of a magnetic head slider according to a second embodiment of the present invention as seen in the direction of an bearing surface thereof.

A second embodiment of the present invention will now be described with reference to FIG. 5. As shown in the same figure, web-like pads 15a and 15b are formed as air intake portions in the transverse direction of the leading end side of two leading end-side flying pads 5a and 5b in a magnetic head slider 11 according to this embodiment. Other constructional elements are the same as in the previous first embodiment (FIG. 1). The height (h) of the web-like pads 15a and 15b is substantially equal to or a little lower than the leading end-side flying pads 5a and 5b, the web-like pads 15a and 15b being partially depressed to the same height as a step bearing surface 7a. This depression, indicated at 15c, is formed centrally of the web-like pads 15a and 15b. The depression 15c may be formed using a method wherein a single web-like pad is formed on the step bearing surface 7a and thereafter the central portion is removed by ion milling for example or a method wherein web-like pads 15a and 15b are formed separately on the step bearing surface 7a. Also in this second embodiment, when the magnetic head slider 11 assumes a forwardly tilted attitude, a restoring force is obtained for restoring the magnetic head slider 11 to its normal flying attitude because there is provided an air inlet path (depression 15c) for the admission of air to the leading-side flying pads 5a and 5b in the magnetic head slider. Moreover, even if a front edge portion of the magnetic head slider 11 comes into contact with the magnetic disk 12, the slider can soon revert to its normal flying attitude because the air inlet path is ensured, with no chance of damage to the information stored on the magnetic disk 12.

Figure 6:
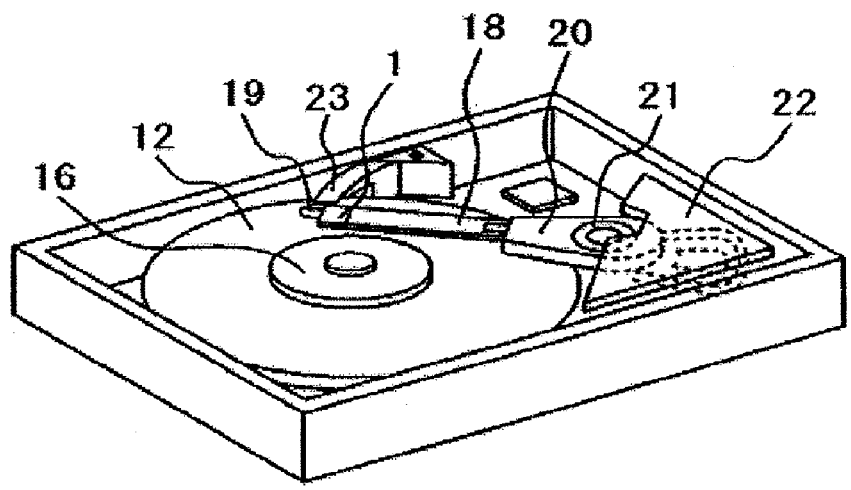
FIG. 6 is a configuration diagram of a magnetic disk drive which carries thereon a magnetic head slider embodying the present invention.

FIG. 6 is a configuration diagram of a magnetic disk drive which carries thereon the above magnetic head slider 1 (11) embodying the invention. A magnetic disk 12 having a smoothed surface is attached to a spindle motor 16. The magnetic head slider 1 (11) which carries thereon a magnetic head 9 to write or read information with respect to the magnetic disk 12 is attached to one end of a suspension 18. The other end of the suspension 18 is attached to a head arm 20. The head arm 20 is mounted on a pivot bearing 21 and a coil of a voice coil motor (VCM) 22 is secured to the pivot bearing 21 on the side opposite to the head arm 20. When the coil of the VCM 22 is energized, the head arm 20 rotates together with the pivot bearing 21 and the magnetic head slider 1 is located to a predetermined radial position over the magnetic disk 12. The suspension 18 and the head arm 20 constitute a support mechanism for the magnetic head slider 1. Likewise, the pivot bearing 21 and the VCM 22 constitute an actuator for the magnetic head slider 1.

In a state in which the magnetic disk 12 does not rotate, the magnetic head slider 1 is held (unloaded) on a ramp mechanism 23 through a lift tab 19 formed at a front end of the suspension 18, the ramp mechanism 23 being provided at a position spaced away from the outer periphery of the magnetic disk 12. When the number of revolutions of the magnetic disk 12 has reached a predetermined number of revolutions, the lift tab 19 is moved toward the magnetic disk 12 along the slope of the ramp mechanism 23, allowing the magnetic head slider 1 to be loaded (loading) over the rotating disk surface.

According to this magnetic disk drive it is possible to prevent damage of the recording medium caused by continuous contact of the front edge portion of the magnetic head slider with the recording medium and hence possible to effect write or read of information stably even with respect to a magnetic disk having a smoothed surface. Consequently, it is possible to obtain a highly reliable magnetic disk drive. Although the magnetic disk drive described above has the ramp mechanism as an example, it goes without saying that the same effects as above can be obtained also in the case of a magnetic disk drive of, for example, CSS type not having a ramp mechanism.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head slider comprising a leading end, an air bearing surface, and a trailing end, said air bearing surface including:
   flying pads formed on said leading end side and said trailing end side;
   a step bearing surface formed between said leading end and said flying pads and around said flying pads;
   a negative pressure groove formed recessed with respect to said step bearing surface;
   a magnetic head provided in the flying pad formed on said trailing end side; and
   an aperture formed in said leading end and being in a shape of a rectangle not occupying the entire leading end.

2. A magnetic head slider according to claim 1, wherein a depth of said aperture is in the range of about 0.5 to 2.0 μm with respect to said flying pads.

3. A magnetic head slider according to claim 2, wherein said aperture is formed centrally of said leading end and a width thereof is in the range of about one third to one half of the width of said leading end.

4. A magnetic head slider according to claim 2, wherein said aperture is formed centrally of said leading end and a width thereof is in the range of about 0.3 to 0.5 mm when the width of said leading end is about 1.0 mm.

5. A magnetic disk drive comprising:
   a magnetic disk to be rotated by a spindle motor;
   a magnetic head to write or read information with respect to said magnetic disk;
   a magnetic head slider with said magnetic head mounted thereon;

a support mechanism to support said magnetic head slider; and an actuator to pivot said support mechanism to locate said magnetic head slider at an arbitrary position in a radial direction of said magnetic disk;

wherein said magnetic head slider comprises a leading end, an air bearing surface, and a trailing end, said air bearing surface including: flying pads formed on said leading end side and said trailing end side; a step bearing surface formed between said leading end and said flying pads and around said flying pads; a negative pressure groove formed in a depressed state with respect to said step bearing surface; a magnetic head provided in the flying pad formed on said trailing end side; and an air intake portion for conducting air to the flying pad formed on said leading end side upon contact of said leading end with said magnetic disk, said air intake portion being in a shape of a rectangle not occupying the entire leading end.

6. A magnetic disk drive according to claim 5, wherein a depth of said aperture is in the range of about 0.5 to 2.0 mm with respect to said flying pads.

7. A magnetic disk drive according to claim 6, wherein said aperture is formed centrally of said leading end and a width thereof is in the range of about one third to one half of the width of said leading end.

8. A magnetic disk drive according to claim 6, wherein said aperture is formed centrally of said leading end and a width thereof is in the range of about 0.3 to 0.5 mm when the width of said leading end is about 1.0 mm.

* * * * *